R. BURNS, Jr.
Carriage-Spring.
No. 11,345
Patented July 18, 1854.
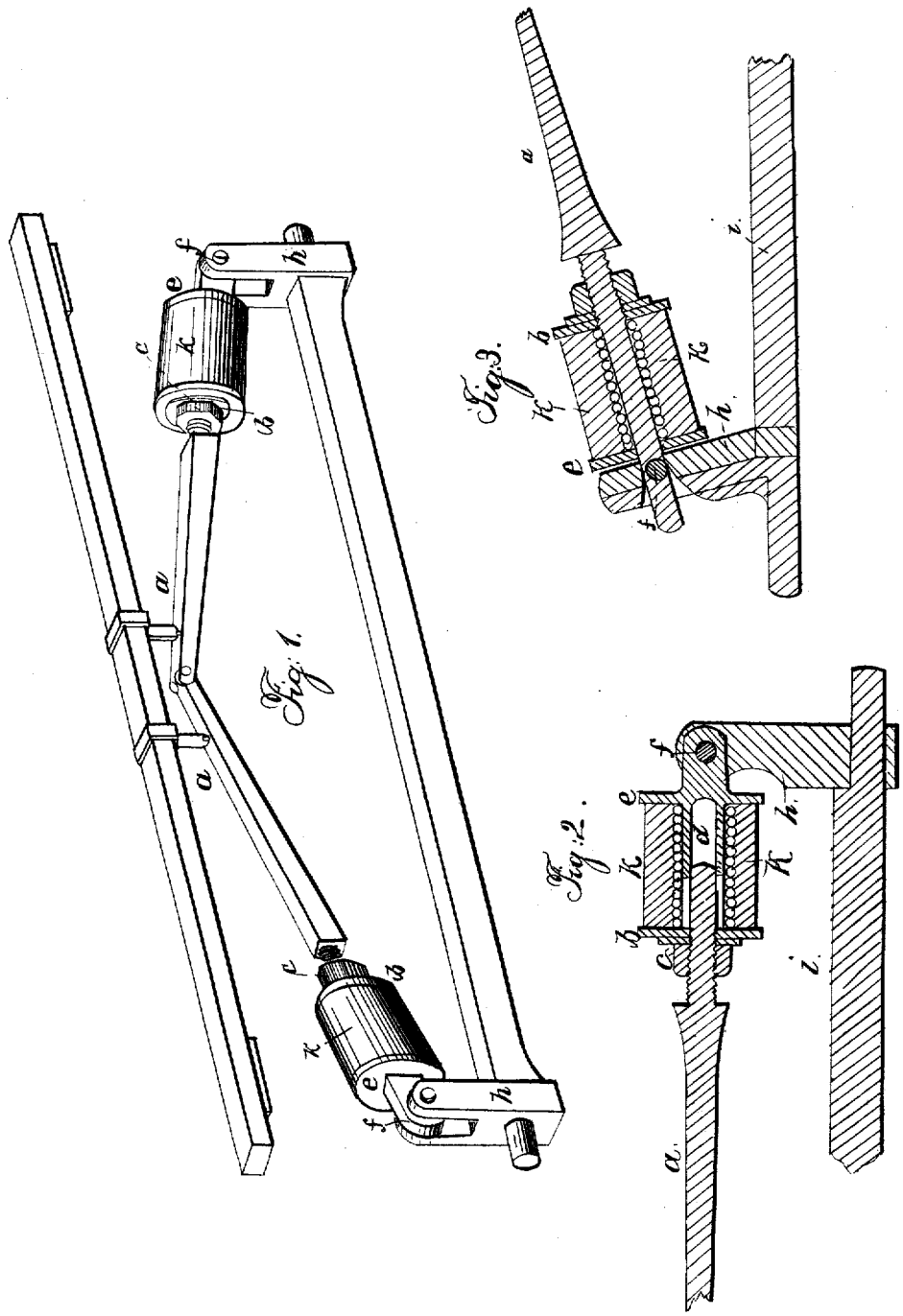

UNITED STATES PATENT OFFICE.

MARY BURNS, OF NEW YORK, N. Y., ADMINISTRATRIX OF ROBT. BURNS, JR., DECEASED, LATE OF NEW YORK, N. Y.

CARRIAGE-SPRING FOR LIGHT VEHICLES.

Specification of Letters Patent No. 11,345, dated July 18, 1854.

*To all whom it may concern:*

Be it known that ROBERT BURNS, Jr., deceased, late of the city, county, and State of New York, did invent certain new and useful Improvements in Adjustable Springs, of which the accompanying model was made by and under the direction of the said ROBERT BURNS a short time previous to his decease; and I, MARY BURNS, administratrix of the said ROBERT BURNS, Jr., deceased, do hereby declare that the following is a full, clear, and distinct description of the said invention, reference being had to the accompanying drawing, forming part of this specification, in which—

Figure 1 is a perspective view; Fig. 2 is a sectional view showing the manner of combining the elongated bars with the compressible spring of india rubber or other substance of similar nature and for like purpose. Fig. 3 represents the elongated toggle-joint bars as passing entirely through the compressible spring and through an upright stud attached to the axle or spring bed.

My new arrangement and construction of springs consists in combining two or more india rubber cylindrical compressing springs with a bar spring or toggle bar capable of being lengthened or shortened to cause said spring to be more or less flexible to suit any given weight or number of persons that may be desirable.

($a$ $a$) represents the spring bar and the toggle-joint bars on either end of which is a flanch of circular form as shown at ($b$) between which and the shoulder of said bars is the nut ($c$) intended to weaken or stiffen said spring by lengthening or shortening the same. The two ends of this spring enter tubes ($d$) having a flanch ($e$) affixed thereunto beyond and outside of which there is a joint or bearing ($f$) by which it is joined by a clip ($h$) to the axle or spring bed ($i$). Between the flanches ($b$ and $e$) are placed cylindrical rubber or compressible springs ($k$) surrounding the tubes, and the disks being kept in place by the tube ($d$) and the end as clearly shown in Fig. 2.

Fig. 3 shows the elongated toggle-joint bar as passing through the india rubber compressible spring and through an upright stud ($h$) and passing through hole ($g$), which hole is elongated on the outer side to admit of the end of the spring rising or falling. By this arrangement it will be seen that any force brought upon the spring bar at ($a$ $a$) will cause the rubber spring to be compressed and which being lengthened or shortened to suit the number of persons or the weight desired to be kept in a vibrating or easy riding position.

Having thus fully described my improved construction and arrangement of springs I do not claim the helical metallic spring inside of the india rubber spring ($k$) as appears to be set forth in the drawings, Figs. 2 and 3. Said appearance being a false representation in the said described drawings, the same is not described in the specifications, but

What I claim therein as new and desire to secure by Letters Patent is—

1. The combination of india rubber or other compressible materials with a bar spring having a toggle-joint in its center.

2. I also claim the lengthening and shortening of the toggle-joint bar between the compressible springs ($k$) by means of the screw or nut ($c$) by which they are made to sustain their required weight with a proper degree of elasticity having a greater or less stiffness in the spring bracing of the carriage.

MARY BURNS.

Witnesses:
D. A. FOWLER,
HORATIO P. CARR.